(12) United States Patent
Gallagher, III

(10) Patent No.: US 7,593,525 B1
(45) Date of Patent: Sep. 22, 2009

(54) PATTERNLESS ENCRYPTION AND DECRYPTION SYSTEM AND METHOD

(75) Inventor: Raymond J. Gallagher, III, Rancho Santa Margarita, CA (US)

(73) Assignee: Multiple Shift Key, Inc., Rancho Cucamonga, CA (US)

( * ) Notice: Subject to any disclaimer, the term of this patent is extended or adjusted under 35 U.S.C. 154(b) by 558 days.

(21) Appl. No.: 10/631,326

(22) Filed: Aug. 1, 2003

Related U.S. Application Data

(60) Provisional application No. 60/400,608, filed on Aug. 2, 2002.

(51) Int. Cl.
H04L 9/28 (2006.01)
(52) U.S. Cl. ........................................ 380/28
(58) Field of Classification Search ........................ None
See application file for complete search history.

(56) References Cited

U.S. PATENT DOCUMENTS

| | | | |
|---|---|---|---|
| 4,441,095 A | 4/1984 | Widmer et al. | |
| 4,675,477 A * | 6/1987 | Thornwall | ................ 380/267 |
| 5,113,444 A | 5/1992 | Vobach | |
| 5,193,115 A | 3/1993 | Vobach | |
| 5,307,412 A | 4/1994 | Vobach | |
| 5,335,280 A | 8/1994 | Vobach | |
| 5,479,513 A | 12/1995 | Protopopescu et al. | |
| 5,533,128 A | 7/1996 | Vobach | |
| 5,724,427 A * | 3/1998 | Reeds, III | ................ 380/259 |
| 5,835,604 A | 11/1998 | Lee | |
| 6,002,769 A | 12/1999 | McGough | |
| 6,253,328 B1 | 6/2001 | Smith, Jr. | |
| 6,438,230 B1 | 8/2002 | Moore | |
| 2003/0152230 A1 | 8/2003 | Eaker | |

FOREIGN PATENT DOCUMENTS

JP 2001013870 1/2001

* cited by examiner

*Primary Examiner*—Brandon S Hoffman
(74) *Attorney, Agent, or Firm*—Fulwider Patton LLP

(57) ABSTRACT

A system for converting a message into a patternless encrypted message. The message includes a plurality of message elements. The system includes encryption software, which comprises an encryption substitution set, for converting the message into the patternless encrypted message, able to generate a table of substitutes for each message element. The table is comprised of a plurality of truly random set elements to be assigned to each of the plurality of message elements. The encryption software comprises multiple shift-key replacement.

28 Claims, 9 Drawing Sheets

|        | Lower Case |      |      |
|--------|------------|------|------|
|        |            | from | to   |
| space  |            | 0    | 168  |
| a      | 49         | 169  | 218  |
| b      | 17         | 219  | 236  |
| c      | 26         | 237  | 263  |
| d      | 24         | 264  | 288  |
| e      | 70         | 289  | 359  |
| f      | 12         | 360  | 372  |
| g      | 13         | 373  | 386  |
| h      | 27         | 387  | 414  |
| i      | 59         | 415  | 474  |
| j      | 1          | 475  | 476  |
| k      | 2          | 477  | 479  |
| l      | 13         | 480  | 493  |
| m      | 20         | 494  | 514  |
| n      | 55         | 515  | 570  |
| o      | 43         | 571  | 614  |
| p      | 30         | 615  | 645  |
| q      | 1          | 646  | 647  |
| r      | 49         | 648  | 697  |
| s      | 52         | 698  | 750  |
| t      | 56         | 751  | 807  |
| u      | 12         | 808  | 820  |
| v      | 7          | 821  | 828  |
| w      | 7          | 829  | 836  |
| x      | 2          | 837  | 839  |
| y      | 24         | 840  | 864  |
| z      | 1          | 865  | 866  |
|        |            |      |      |
| A      | 3          | 867  | 870  |
| B      | 3          | 871  | 874  |
| C      | 3          | 875  | 878  |
| D      | 3          | 879  | 882  |
| E      | 3          | 883  | 886  |
| F      | 3          | 887  | 890  |
| G      | 3          | 891  | 894  |
| H      | 3          | 895  | 898  |
| I      | 3          | 899  | 902  |
| J      | 3          | 903  | 906  |
| K      | 3          | 907  | 910  |
| L      | 3          | 911  | 914  |
| M      | 3          | 915  | 918  |
| N      | 3          | 919  | 922  |
| O      | 3          | 923  | 926  |
| P      | 3          | 927  | 930  |
| Q      | 3          | 931  | 934  |
| R      | 3          | 935  | 938  |
| S      | 3          | 939  | 942  |
| T      | 3          | 943  | 946  |

| | | | |
|---|---|---|---|
| U | 3 | 947 | 950 |
| V | 3 | 951 | 954 |
| W | 3 | 955 | 958 |
| X | 3 | 959 | 962 |
| Y | 3 | 963 | 966 |
| Z | 3 | 967 | 970 |
| | | | |
| 1 | 3 | 971 | 974 |
| 2 | 3 | 975 | 978 |
| 3 | 3 | 979 | 982 |
| 4 | 3 | 983 | 986 |
| 5 | 3 | 987 | 990 |
| 6 | 3 | 991 | 994 |
| 7 | 3 | 995 | 998 |
| 8 | 3 | 999 | 1002 |
| 9 | 3 | 1003 | 1006 |
| 0 | 3 | 1007 | 1010 |
| | | | |
| ~ | 3 | 1011 | 1014 |
| ! | 3 | 1015 | 1018 |
| @ | 3 | 1019 | 1022 |
| # | 3 | 1023 | 1026 |
| $ | 3 | 1027 | 1030 |
| % | 3 | 1031 | 1034 |
| ^ | 3 | 1035 | 1038 |
| & | 3 | 1039 | 1042 |
| * | 3 | 1043 | 1046 |
| ( | 3 | 1047 | 1050 |
| ) | 3 | 1051 | 1054 |
| [ | 3 | 1055 | 1058 |
| ] | 3 | 1059 | 1062 |
| { | 3 | 1063 | 1066 |
| } | 3 | 1067 | 1070 |
| = | 3 | 1071 | 1074 |
| + | 3 | 1075 | 1078 |
| - | 3 | 1079 | 1082 |
| ; | 3 | 1083 | 1086 |
| : | 3 | 1087 | 1090 |
| < | 3 | 1091 | 1094 |
| > | 3 | 1095 | 1098 |
| , | 3 | 1099 | 1102 |
| . | 3 | 1103 | 1106 |
| \| | 3 | 1107 | 1110 |
| / | 3 | 1111 | 1114 |
| ' | 3 | 1115 | 1118 |
| " | | 1119 | 1122 |
| Carage return | | 1123 | 1150 |
| Line feed | | 1151 | 1155 |

PATTERNLESS ENCRYPTION AND DECRYPTION SYSTEM AND METHOD

CROSS-REFERENCE TO RELATED APPLICATION

This application is claiming the benefit of a co-pending provisional application Ser. No. 60/400,608, filed on Aug. 2, 2002.

COMPUTER PROGRAM LISTING APPENDIX

A Compact Disc-Recordable (CD-R) which includes a computer program listing is submitted with this application, since the computer program listing has over 300 lines of code. The material on the CD-R is incorporated by reference herein.

BACKGROUND OF THE INVENTION

1. Field of the Invention

The present invention relates generally to encryption and decryption systems, and, more particularly, relates to a patternless encryption and decryption system and method which make a message virtually impossible to read for anyone who does not have the key.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

2. Description of Related Art

An encryption and decryption system is able to enable a message to be transmitted securely. One such encryption technique is to replace all of the characters in the message with some other character. For example "secret message" might look like (!#4%#*ÿ&#!!98#). However, this type of encryption is relatively easy to decipher—by counting the different types of characters, it is relatively easy to establish that (#=e) because {e} is the most common character in the English vernacular. The word "the" is the most common word. These patterns start to appear even after a message has been encrypted, which has led to effective methods that can read encrypted messages.

Therefore, there has existed a need for a system which is capable of encrypting a message so as to prevent the use of patterns to enable decryption thereof. The present invention fulfills these needs.

SUMMARY OF THE INVENTION

Briefly, and in general terms, the present invention provides a system for converting a message into a patternless encrypted message.

The system includes encryption software, which comprises an encryption substitution set, for converting the message into the patternless encrypted message. The message includes a plurality of message elements, and the encryption software is able to generate a table of substitutes for each message element, wherein the table is comprised of a plurality of truly random set elements to be assigned to each of the plurality of message elements. The encryption software comprises multiple shiftkey replacement.

One aspect of the present invention is that the system provides a symmetric algorithm designed to be patternless, to generate a multiplicity of false positives, i.e. decryptions that look right but are wrong, preventing determination of the encryption algorithm.

Another aspect of the present invention is that the system provides protection against a ciphertext-only attack, a brute-force attack, a known-text attack, and/or a chosen-text attack.

Other features and advantages will become apparent from the following detailed description, taken in conjunction with the accompanying drawings, which describe and illustrate, by way of example, the features of the invention.

BRIEF DESCRIPTION OF THE DRAWINGS

FIGS. 1A-1B are a chart of exemplary character assignments for message elements in accordance with the present invention.

DETAILED DESCRIPTION OF THE PREFERRED EMBODIMENTS

Figure 2:
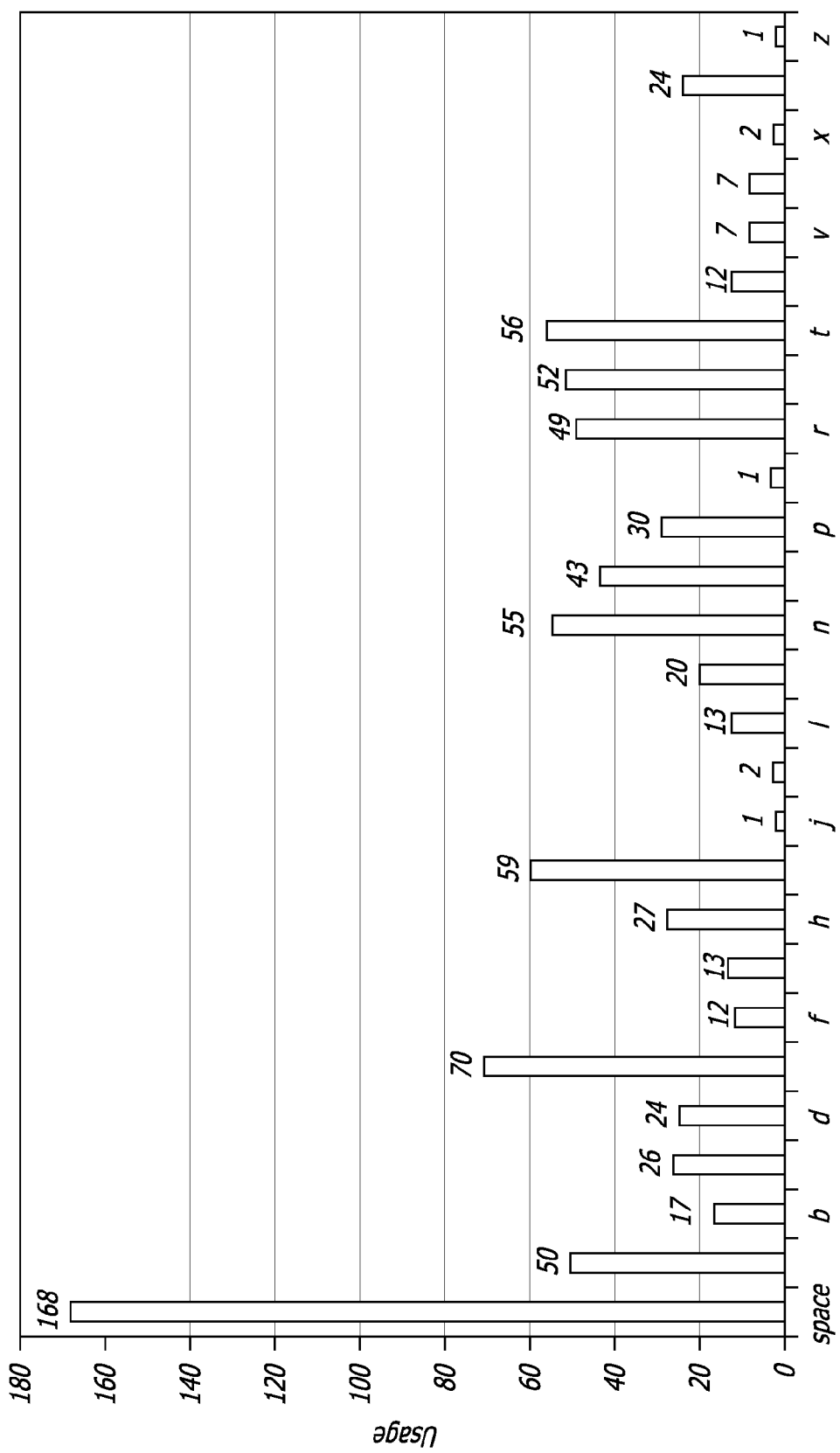
FIG. 2 is a chart of an exemplary character ratio for message elements in accordance with present invention.

Referring to the drawings, and in particular to FIGS. 1-9, there is shown a system for converting a message into a patternless encrypted message, wherein the message includes a plurality of message elements. The message may include for example text, data graphics, photos, videos, and/or files. The system includes encryption software, which comprises an encryption substitution set, for converting the message into the patternless encrypted message, able to generate a table of substitutes for each message element. The table is comprised of a plurality of truly random set elements to be assigned to each of the plurality of message elements. The encryption software comprises multiple shiftkey replacement.

The encryption software may be the same for all users thereof. In that event, the table may be fixed, in that the number of substitutes for each element of the set in the multiple shiftkey replacement may be fixed independent of the message. The message is in a language, and the number of set element substitutes may be pre-calculated based on the language. Where the encryption software is the same for all users, it may be a ratio, in that the number of substitutes for each element of the set in the multiple shiftkey replacement may be a ratio of the frequency of each message element in a medium. The medium may comprise the message language. The message may be in a language, and the table generated by the encryption software may be calculated based on the message language. The table generated by the encryption software may be calculated based on the message.

The encryption software may be calculated for each message. In that event, it may be a ratio, in that the number of substitutes for each element of the set in the multiple shiftkey replacement may be a ratio of the frequency of each message element in a medium. The medium may comprise the message language. The medium may alternatively comprise the message. The message may be in a language, and the table generated by the encryption software may be calculated based on the message language. The table generated by the encryption software may be calculated based on the message.

The system may further comprise formatting software, able to be applied to the patternless encrypted message for transmission thereof to a recipient.

The characters in the character assignment table, for example, as illustrated in FIGS. 1A-1B, may include lower case letters, upper case letters, positive numbers, negative numbers, fractions, decimals, and/or special characters such as marks, spaces, signs, symbols, carriage return, and/or line feed. The randomly selected replacement characters may be generated by a random number generator. The random number generator is an algorithm which seeds and re-seeds for each replacement character based on the time of the system. It takes the system clock and, in the millisecond that it hits, that number is used to seed the system. The number of replacement characters for each character in a truly random set may be calculated based on the least common character, which may be used as a least common denominator in ratios for all other characters, as shown in FIG. 2.

Figure 3:
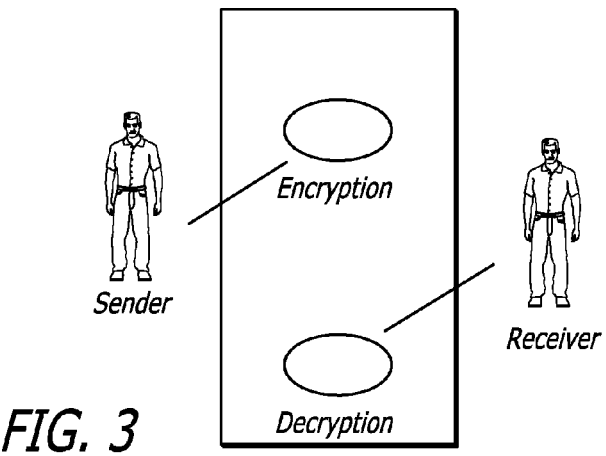
FIG. 3 is a diagram of an encryption use case in accordance with the present invention.
Figure 4:
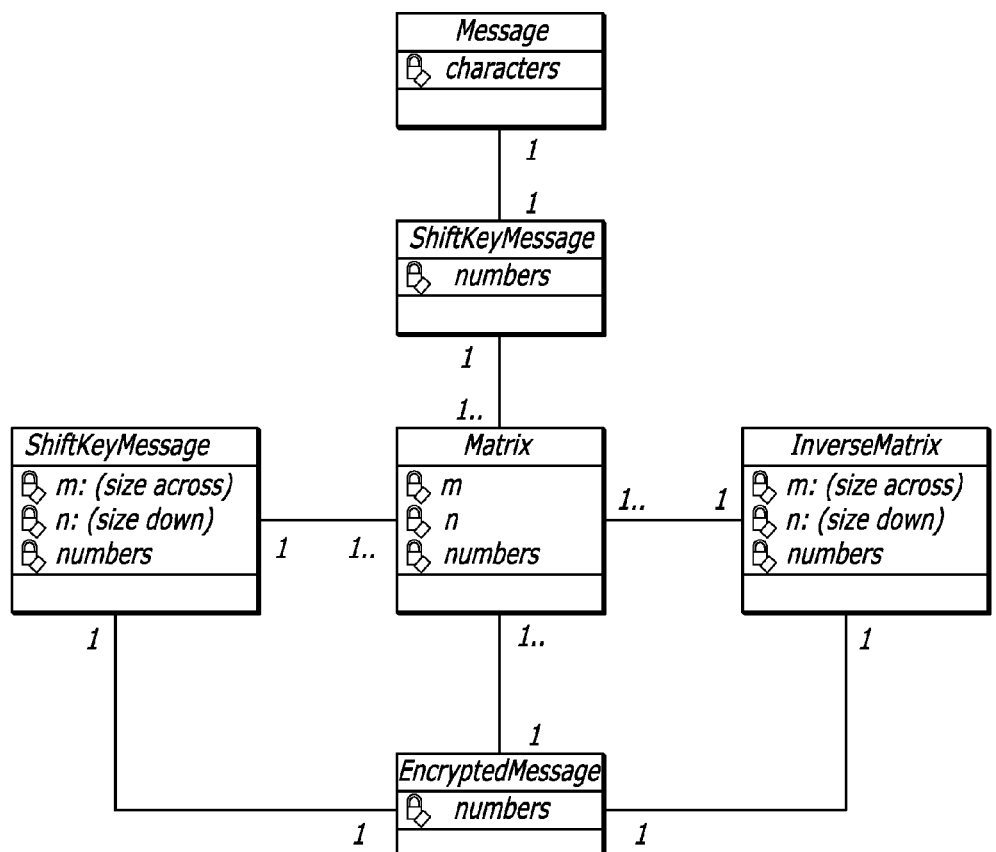
FIG. 4 is a diagram of an encryption conceptual model in accordance with the present invention.
Figure 5A:
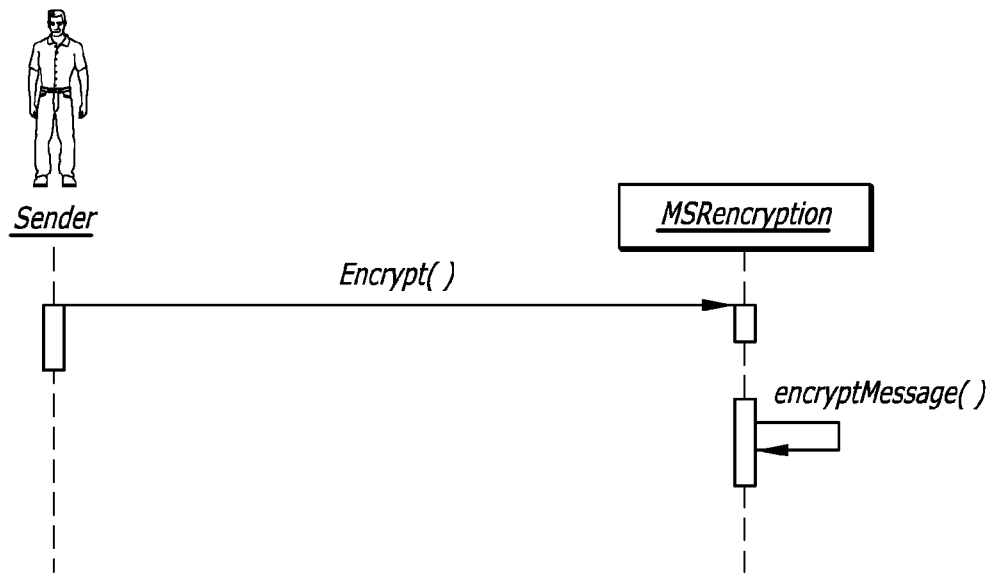
FIG. 5 is a diagram of an encryption system sequence in accordance with the present invention.
Figure 5B:
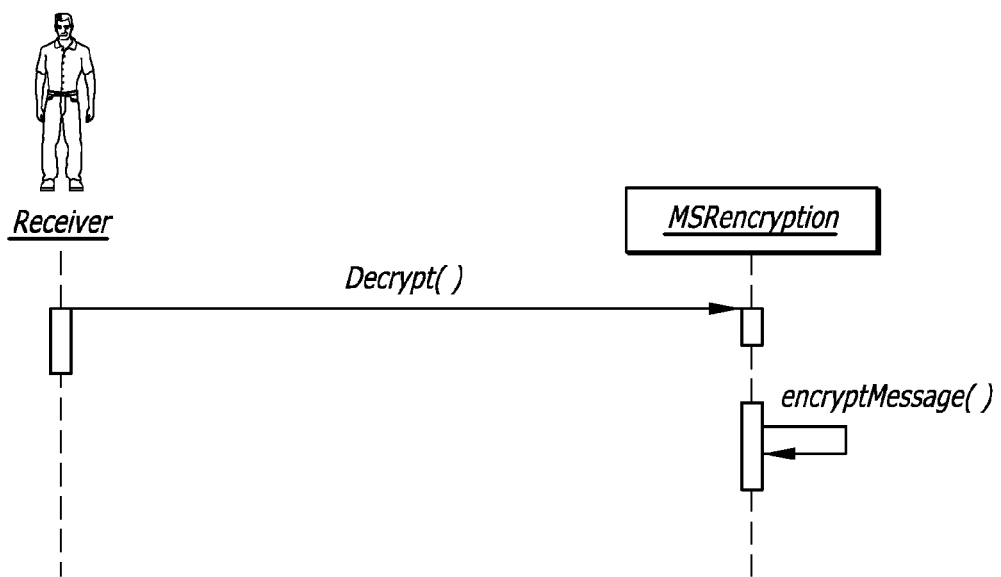
Figure 6A:
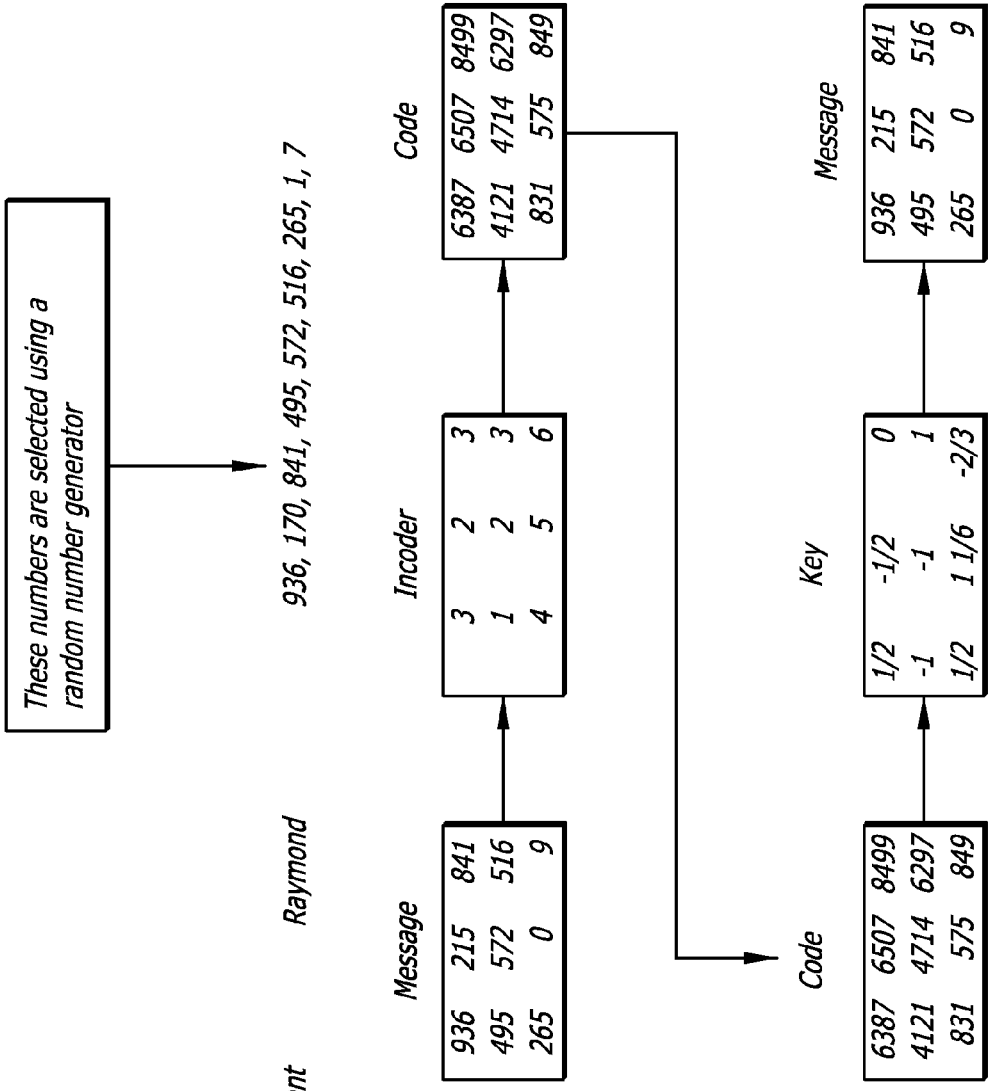
FIGS. 6A-6C are diagrams of examples of character assignment encoding and decoding in accordance with the present invention.
Figure 6B:
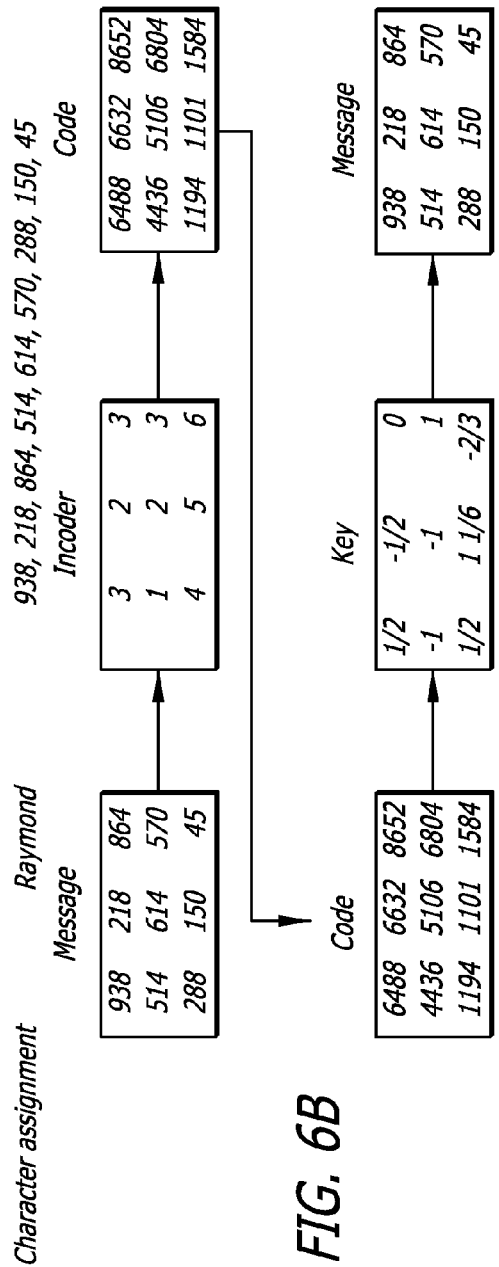
Figure 6C:
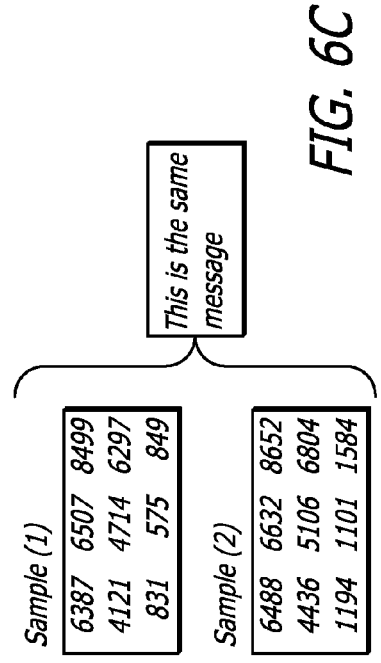
Figure 7A:
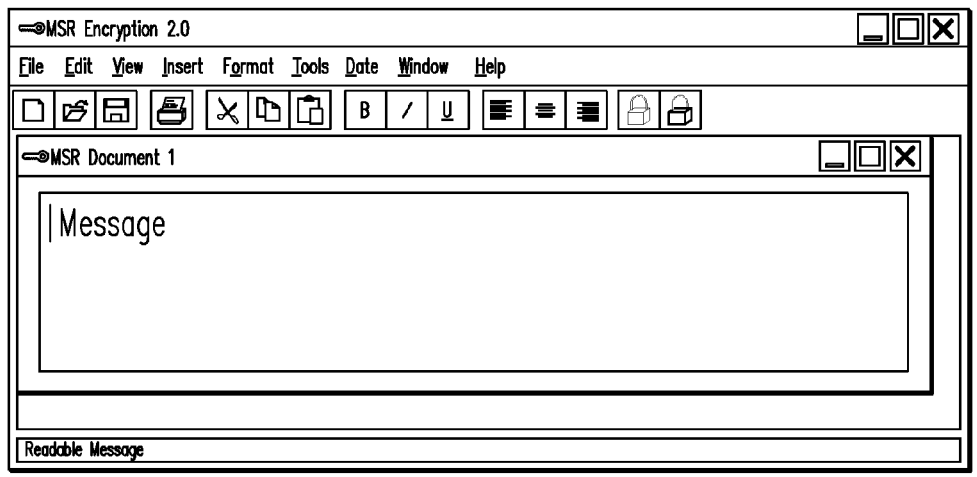
FIGS. 7A-7B are screen shots of an exemplary readable message and a corresponding encoded message in accordance with the present invention.
Figure 7B:
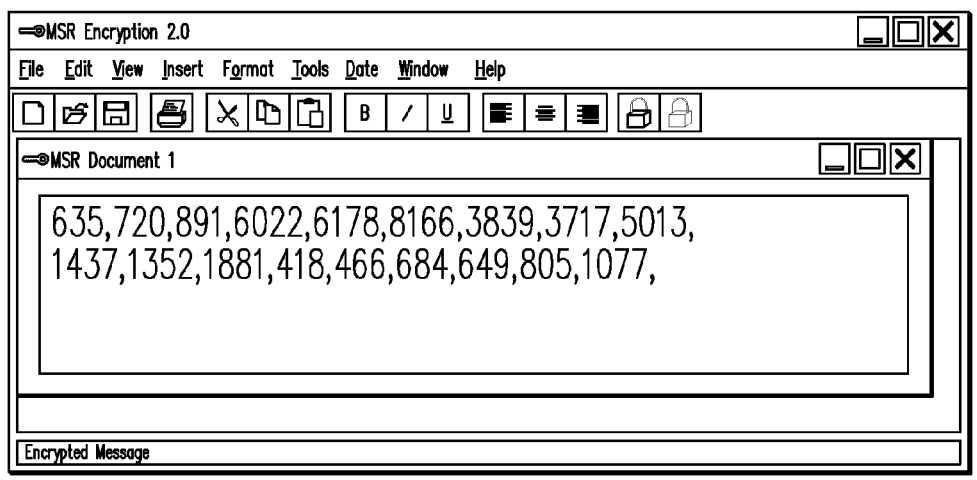

As seen in FIG. 3, in a unified modeling language high level use case, the sender creates a message. The message is then encrypted. The encrypted message is then ready to be sent. The receiver receives the message. The message is then decrypted. The decrypted message is then ready to be read.

In a unified modeling language essential or real use case, as illustrated in FIGS. 4-7, the sender creates a message. The sender directs the system to encrypt the message. The system then breaks the message down into characters, and the characters are replaced by numbers, which are randomly selected from a set, forming a new message which is a series of numbers. This series of numbers may then be cross-multiplied through an encoding matrix, leaving an encrypted message, or the program may display the message which can be saved as a file to the hard drive. The sender may then send the message as desired, or it can be saved as a secure file that will need to be decrypted before it can be read. The receiver then gets the message. Then the receiver directs the system to decrypt the message. The system then reads the message which is a series of numbers into a matrix, and the matrix is then cross-multiplied by the inverse of the encoding matrix. The resulting numbers will represent the shift key replacement. The system will then correlate the numbers to the corresponding characters, and the system will then display the readable message file. The message may then be read by the receiver.

As illustrated in FIGS. 1-9, in a method for use of the system, the message is encrypted into the patternless encrypted message by the encryption software. A table of substitutes may be generated for each message element. A plurality of truly random set elements are assigned to each of the plurality of message elements. The formatting software may be applied to the patternless encrypted message for transmission thereof to a recipient.

The message may be encrypted by encryption software which is the same for all users. Where the encryption software is the same for all users, and the table is fixed, in that the number of substitutes for each element of the set in the multiple shiftkey replacement is fixed independent of the message, the message is in a language, and the number of set element substitutes is pre-calculated based on the language, the table of substitutes may be fixed, including fixing the number of substitutes for each element of the set in the multiple shiftkey replacement independent of the message, and pre-calculating the number of set element substitutes based on the language of the message. Where the encryption software is the same for all users, and the encryption software is a ratio, in that the number of substitutes for each element of the set in the multiple shiftkey replacement is a ratio of the frequency of each message element in a medium, the table of substitutes is generated wherein the number of substitutes for each element of the set in the multiple shiftkey replacement is a ratio of the frequency of each message element in a medium. Where the encryption software is the same for all users, and the message is in a language, and the table generated by the encryption software is calculated based on the message language, the table of substitutes is generated by calculating the encryption software based on the message language. Where the encryption software is the same for all users, and the table generated by the encryption software is calculated based on the message, the table of substitutes is generated by calculating the encryption software based on the message.

Where the message is in a language, and the medium comprises the message, the table of substitutes is generated wherein the number of substitutes for each element of the set in the multiple shiftkey replacement is a ratio of the frequency of each message element in the message language medium. Where the message is in a language, and the medium comprises the message, the table of substitutes is generated wherein the number of substitutes for each element of the set in the multiple shiftkey replacement is a ratio of the frequency of each message element in the message medium.

The message may be encrypted by the encryption software which is calculated for each message. Where the encryption software is calculated for each message, and the encryption software is a ratio, in that the number of substitutes for each element of the set in the multiple shiftkey replacement is a ratio of the frequency of each message element in a medium, the table of substitutes is generated wherein the number of substitutes for each element of the set in the multiple shiftkey replacement is a ratio of the frequency of each message element in a medium. Where the encryption software is calculated for each message, the message is in a language, and the table generated by the encryption software is calculated based on the message language, the table of substitutes is generated by calculating the encryption software based on the message language. Where the encryption software is calculated for each message, and the table generated by the encryption software is calculated based on the message, the table of substitutes is generated by the encryption software based on the message.

Figures 8, 9:
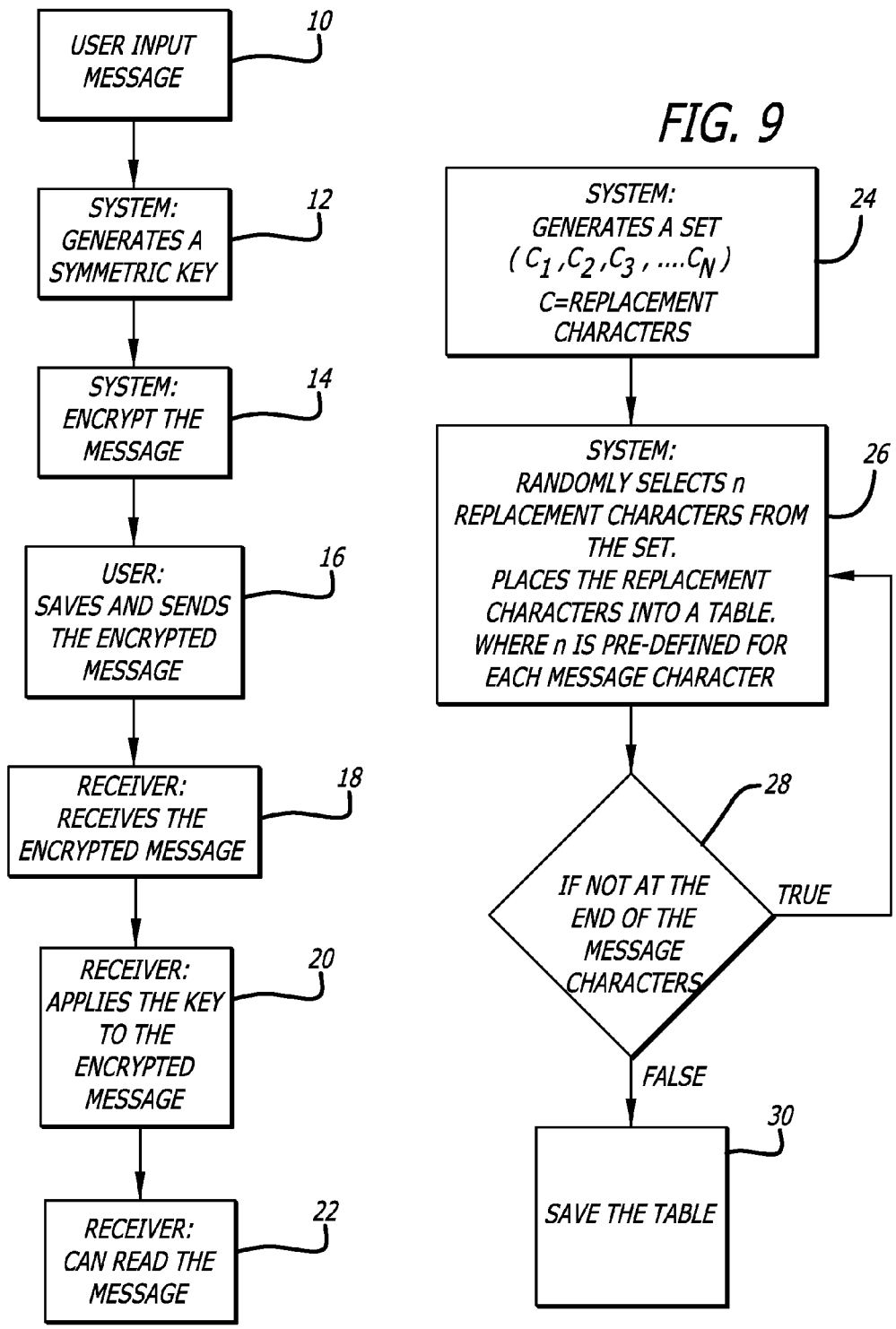
FIG. 8 is a flow chart of a patternless encryption and decryption system in accordance with the present invention.
FIG. 9 is a flow chart of a multiple shiftkey replacement system in accordance with the present invention.

As shown in the flow chart in FIG. 8, at step 10, the user inputs a message. The system then generates a symmetric key, at step 12. In step 14, the system encrypts the message with the key. The user, at step 16, then saves and sends the encrypted message. The receiver then receives the encrypted message, at step 18. The receiver, at step 20, then applies the key to the encrypted file. The symmetric key applied by the receiver is the same symmetric key which is used by the sender to encrypt the message, which has been forwarded to the receiver. At step 22, the receiver may then read the message.

The system, as seen in FIG. 9, generates a set of replacement characters, as parts of the symmetric key, at step 24. In step 26, the system randomly selects replacement characters from the set, and places the replacement characters into a table, where the number of replacements is predefined for each message character. Then at step 28, if it is true that the system is not at the end of the message characters, it repeats step 26. If it is at the end, the system saves the table at step 30.

The table of replacement characters may be generated, for example, by doing an analysis on a message. The analysis may determine the occurrence of the characters to establish their ratios. The formula for analysis is to let X equal any character in the file, let A equal the occurrence of character X, let B equal the occurrence of the character that appears least, and then calculate the ratio $\{A/B\}$ for each character. This gives the set $\{A_1/B, A_2/B, \ldots A_i B\}$. The second step would for example be to reduce all of the ratios to the least common denominator b. This gives the set $\{a_1/b, a_2/b, , , , a_i/b\}$. The third step for example would be to use the set $\{a_1, a_2, a_3, \ldots a_i\}$ to build a table of truly random numbers that will be assigned to each character i.e. if $[a_i=5$ then the set could be $\{2, 0.03568, -5, -7.58972, 1000000\}]$. The fourth step would be to encrypt the message by replacing each character by a number in the set that is assigned to it, which may be implemented randomly.

Simple multiple shiftkey replacement (msr) is msr without any analysis, as for example, where every character may get $\{1O\}$ shift keys. Simple msr can be used to dramatically increase the effectiveness of current encryption algorithms. Full msr can also be used to make current encryption algorithms unbreakable. Full msr may be used in conjunction with any encryption algorithm, such as a matrix.

In an exemplary operation of the present invention, msr encryption protocol was able to encrypt a 7.11 KB message data file in less than one second; the resulting file was a 36.8 KB msr message. The time includes reading the message into memory and writing it back onto the hard drive. It was able to decrypt the 36.8 KB msr message back into the plaintext in less than one second; the resulting message was a 7.11 KB message data file. The time includes reading the message into memory and writing it back onto the hard drive.

The msr protocol is a symmetric algorithm designed to be patternless, to generate a multiplicity of false positives, i.e. decryptions that look right but are wrong, preventing determination of the encryption algorithm, and to provide protection against a ciphertext-only attack, and/or a brute-force attack. The protocol also provides greater protection against a known-text attack, and/or a chosen-text attack.

A known-text attack against msr would require an extremely large amount of data. For example, the message "Raymond" would need to be known and sent one hundred thirty eight trillion five hundred forty nine billion four hundred eleven million times just to collect enough data. At this point it is still impossible to retrieve the entire key. It might be possible to retrieve part of the key. Also a larger message would require even larger amounts of data. For example: "Raymond" requires it to be sent 138,549,411,000,000. "Raymond J Gallagher III" requires it to be sent 30,601,156,535,824,800,000,000,000,000,000,000. This is a dramatic increase and will increase depending on the size of the message. Even greater increases can be achieved using larger keys. The key that is used in an exemplary implementation to encrypt a sample file is 5.61 KB. This is only an example, and a key used in production software may be many times larger. Other properties of the msr encryption protocol include, for example, that the algorithm will accept a key of any size 370 bytes or larger. The keys can be increased or decreased without changing the program.

Examples of a preferred form of source code, for use in carrying out the above described software and firmware steps in conjunction with the hardware as described above, are included in the CD-R as the official copy thereof which is a computer program listing appendix, and which is a part of this application and incorporated by reference herein.

From the foregoing it will be appreciated that the system of the present invention provides advantages in preventing the use of patterns to enable decryption of an encrypted message, so as to make a message virtually impossible to be read by anyone who does not have the key. While several particular forms of the invention have been illustrated and described, it will be apparent that various modification can be made without departing from the spirit and scope of the invention. Accordingly, the invention is not to be limited, except as by the following claims.

What is claimed is:

1. A system for converting a message into a patternless encrypted message, wherein the message includes a plurality of message elements, comprising:

encryption software, which comprises an encryption substitution set, for converting the message into the patternless encrypted message, adapted to generate a table of substitutes for each message element, wherein the table is comprised of a plurality of randomly-generated set elements to be assigned to each of the plurality of message elements, and an encoding matrix which cross-multiples the message elements, to generate the patternless encrypted message, and wherein the encryption software includes multiple shiftkey replacement;

memory, for storing the encryption software; and a processor, for processing the encryption software.

2. The system of claim 1, further comprising formatting software, adapted to be applied to the patternless encrypted message for transmission thereof to a recipient.

3. The system of claim 1, wherein the encryption software is the same for all users thereof.

4. The system of claim 3, wherein the table is fixed, in that the number of substitutes for each element of the set in the multiple shiftkey replacement is fixed independent of the message, and wherein the message is in a language, and the number of set element substitutes is pre-calculated based on the language.

5. The system of claim 3, wherein the encryption software is a ratio, in that the number of substitutes for each element of the set in the multiple shiftkey replacement is a ratio of the frequency of each message element in a medium.

6. The system of claim 5, wherein the medium comprises the message language.

7. The system of claim 3, wherein the message is in a language, and the table generated by the encryption software is calculated based on the message language.

8. The system of claim 3, wherein the table generated by the encryption software is calculated based on the message.

9. The system of claim 1, wherein the encryption software is calculated for each message.

10. The system of claim 9, wherein the encryption software is a ratio, in that the number of substitutes for each element of the set in the multiple shiftkey replacement is a ratio of the frequency of each message element in a medium.

11. The system of claim 10, wherein the medium comprises the message language.

12. The system of claim 10, wherein the medium comprises the message.

13. The system of claim 9, wherein the message is in a language, and the table generated by the encryption software is calculated based on the message language.

14. The system of claim 9, wherein the table generated by the encryption software is calculated based on the message.

15. A method of converting a message into a patternless encrypted message, wherein the message includes a plurality of message elements, in a system which comprises encryption software, which comprises an encryption substitution set, for converting the message into the patternless encrypted message, adapted to generate a table of substitutes for each message element, wherein the table is comprised of a plurality of randomly-generated set elements to be assigned to each of the plurality of message elements, and an encoding matrix which cross-multiples the message elements to generate the patternless encrypted message, and wherein the encryption software includes multiple shiftkey replacement, memory, for storing the encryption software, and a processor, for processing the encryption software, wherein the method comprises:

storing the encryption software in the memory; and processing the encryption software in the processor, which includes:

encrypting the message into the patternless encrypted message by the encryption software which includes the multiple shiftkey replacement, including generating a table of substitutes for each message element, which includes randomly generating each of the plurality of random set elements;

assigning each of the plurality of randomly-generated set elements to each of the plurality of message elements; and cross-multiplying the message elements through the encoding matrix, to generate the patternless encrypted message.

16. The method of claim 15, further comprising formatting software, adapted to be applied to the patternless encrypted message for transmission thereof to a recipient, and further comprising applying the formatting software to the patternless encrypted message for transmission thereof to a recipient.

17. The method of claim 15, wherein the encryption software is the same for all users thereof, and wherein encrypting further comprises encrypting the message by the encryption software which is the same for all users thereof.

18. The method of claim 17, wherein the encryption software is a ratio, in that the number of substitutes for each element of the set in the multiple shiftkey replacement is a ratio of the frequency of each message element in a medium, and wherein calculating further comprises generating the table of substitutes wherein the number of substitutes for each element of the set in the multiple shiftkey replacement is a ratio of the frequency of each message element in a medium.

19. The method of claim 18, wherein the medium comprises the message language, and wherein calculating further comprises generating the table of substitutes wherein the number of substitutes for each element of the set in the multiple shiftkey replacement is a ratio of the frequency of each message element in the message language medium.

20. The method of claim 17, wherein the table is fixed, in that the number of substitutes for each element of the set in the multiple shiftkey replacement is fixed independent of the message, and wherein the message is in a language, and the number of set element substitutes is pre-calculated based on the language, and wherein generating further comprises generating the table of substitutes which is fixed, including fixing the number of substitutes for each element of the set in the multiple shiftkey replacement independent of the message, and pre-calculating the number of set element substitutes based on the language of the message.

21. The method of claim 17, wherein the message is in a language, and the table generated by the encryption software is calculated based on the message language, and wherein calculating further comprises generating the table of substitutes by the encryption software based on the message language.

22. The method of claim 17, wherein the table generated by the encryption software is calculated based on the message, and wherein calculating further comprises generating the table of substitutes by the encryption software based on the message.

23. The method of claim 15, wherein the encryption software is calculated for each message, and wherein encrypting further comprises encrypting the message by the encryption software which is calculated for each message.

24. The method of claim 23, wherein the encryption software is a ratio, in that the number of substitutes for each element of the set in the multiple shiftkey replacement is a ratio of the frequency of each message element in a medium, and wherein calculating further comprises generating the table of substitutes wherein the number of substitutes for each element of the set in the multiple shiftkey replacement is a ratio of the frequency of each message element in a medium.

25. The method of claim 24, wherein the medium comprises the message language, and wherein calculating further comprises generating the table of substitutes wherein the number of substitutes for each element of the set in the multiple shiftkey replacement is a ratio of the frequency of each message element in the message language medium.

26. The method of claim 24, wherein the medium comprises the message, and wherein calculating further comprises generating the table of substitutes wherein the number of substitutes for each element of the set in the multiple shiftkey replacement is a ratio of the frequency of each message element in the message medium.

27. The method of claim 23, wherein the message is in a language, and the table generated by the encryption software is calculated based on the message language, and wherein calculating further comprises generating the table of substitutes by the encryption software based on the message language.

28. The method of claim 23, wherein the table generated by the encryption software is calculated based on the message, and wherein calculating further comprises generating the table of substitutes by the encryption software based on the message.

* * * * *